US012558853B2

(12) United States Patent
Dando

(10) Patent No.: US 12,558,853 B2
(45) Date of Patent: Feb. 24, 2026

(54) SEMI-CONFORMABLE PRESSURE APPLICATION SYSTEM AND METHOD FOR JOINING COMPOSITE PARTS

(71) Applicant: Spirit AeroSystems, Inc., Wichita, KS (US)

(72) Inventor: Kerrick Robert Dando, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 932 days.

(21) Appl. No.: 17/835,147

(22) Filed: Jun. 8, 2022

(65) Prior Publication Data

US 2023/0398748 A1 Dec. 14, 2023

(51) Int. Cl.
| | |
|---|---|
| *B29C 65/32* | (2006.01) |
| *B29C 33/68* | (2006.01) |
| *B29C 65/20* | (2006.01) |
| *B29K 101/12* | (2006.01) |
| *B29L 31/30* | (2006.01) |

(52) U.S. Cl.
CPC .............. *B29C 65/32* (2013.01); *B29C 33/68* (2013.01); *B29C 65/20* (2013.01); *B29K 2101/12* (2013.01); *B29K 2995/0005* (2013.01); *B29L 2031/3076* (2013.01)

(58) Field of Classification Search
CPC ...... B29C 65/32; B29C 33/68; B29K 2101/12
See application file for complete search history.

(56) References Cited

U.S. PATENT DOCUMENTS

| | | | |
|---|---|---|---|
| 10,391,684 B1 | 8/2019 | Margraf, Jr. et al. | |
| 2014/0326411 A1* | 11/2014 | Konita | .............. B29C 66/81455 |
| | | | 156/583.1 |
| 2020/0290290 A1* | 9/2020 | Gergely | .............. B29C 65/3676 |

(Continued)

FOREIGN PATENT DOCUMENTS

| | | | |
|---|---|---|---|
| EP | 3772406 A1 * | 2/2021 | ....... B29C 66/82421 |
| EP | 3772406 | 10/2021 | |

(Continued)

OTHER PUBLICATIONS

European Search Report in related EP Application 23178102.2 dated Nov. 11, 2023, 6 pages.

*Primary Examiner* — Elizabeth M Kerr
(74) *Attorney, Agent, or Firm* — Stinson LLP

(57) ABSTRACT
A system and method for fusing at least two thermoplastic composite components together may include placing faying surfaces of the thermoplastic composite components in contact with each other, placing a separation layer over and against one of the thermoplastic composite components, and placing a multi-layer composite pressure pad over and in contact with the separation layer. The method may also include placing an activated inductor against the multi-layer composite pressure pad for induction welding the two thermoplastic composite components to each other. The thermoplastic composite components may comprise conductive fibers while the multi-layer composite pressure pad may comprise a first layer and a second layer with non-conductive fibers. The first layer may at least partially melt during induction welding of the two thermoplastic composite components while the second layer may remain rigid throughout this welding.

20 Claims, 4 Drawing Sheets

(56) References Cited

U.S. PATENT DOCUMENTS

| 2021/0122123 | A1* | 4/2021 | Wadsworth | B29C 66/3474 |
|---|---|---|---|---|
| 2023/0166458 | A1* | 6/2023 | Labordus | B32B 37/06 |
| | | | | 156/273.9 |
| 2023/0211564 | A1* | 7/2023 | Woods | B23K 13/01 |
| | | | | 219/633 |

FOREIGN PATENT DOCUMENTS

| WO | 2020203206 | 10/2020 |
|---|---|---|
| WO | 2021221510 | 11/2021 |

* cited by examiner

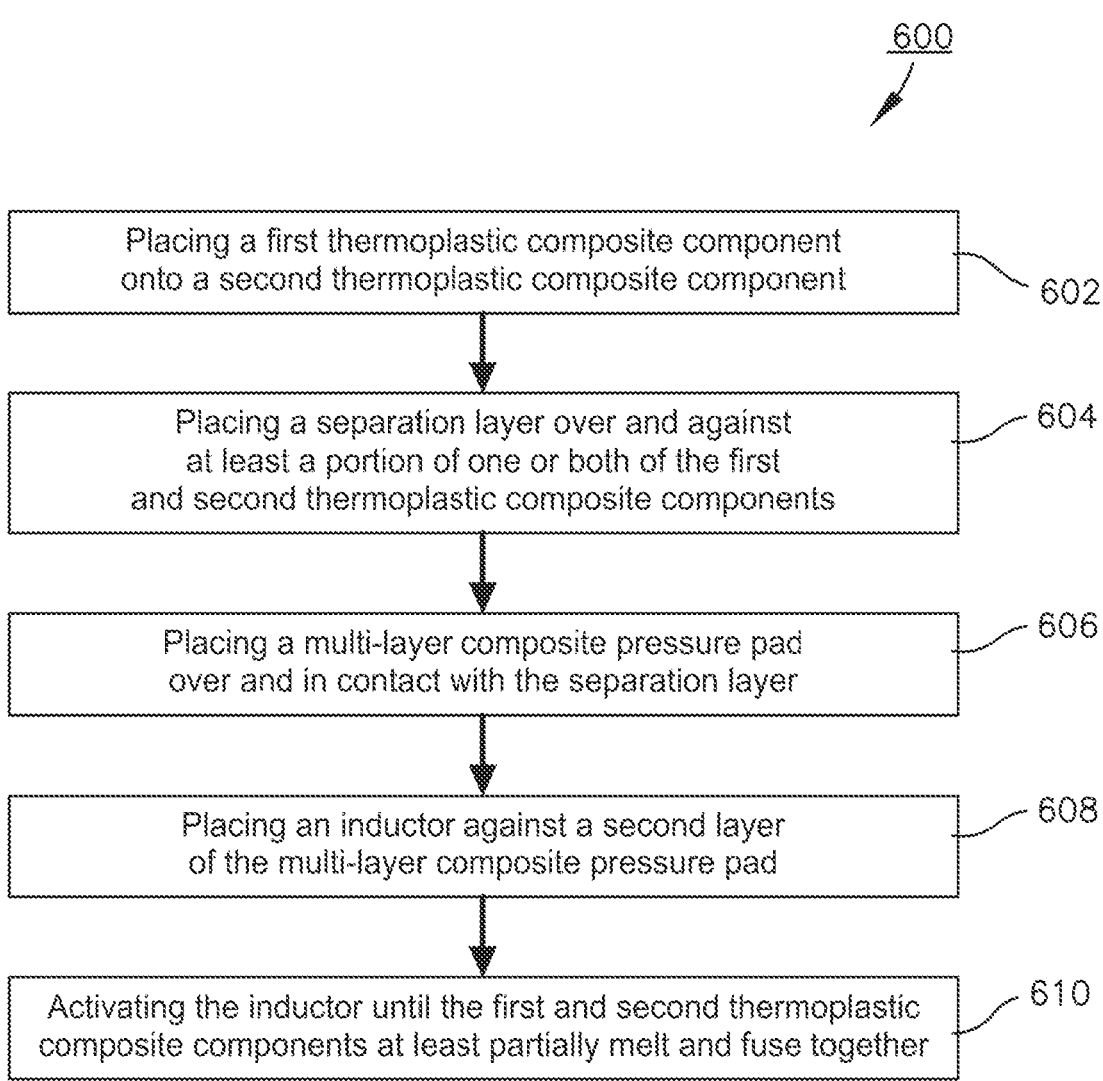

_600_

Placing a first thermoplastic composite component
onto a second thermoplastic composite component — 602

Placing a separation layer over and against
at least a portion of one or both of the first
and second thermoplastic composite components — 604

Placing a multi-layer composite pressure pad
over and in contact with the separation layer — 606

Placing an inductor against a second layer
of the multi-layer composite pressure pad — 608

Activating the inductor until the first and second thermoplastic
composite components at least partially melt and fuse together — 610

*Fig. 6*

SEMI-CONFORMABLE PRESSURE APPLICATION SYSTEM AND METHOD FOR JOINING COMPOSITE PARTS

BACKGROUND OF THE INVENTION

Field of the Invention

Embodiments of the present invention relate to methods and systems for joining thermoplastic composite parts. More particularly, embodiments of the present invention relate to methods and systems for joining thermoplastic composite parts via induction welding.

Description of the Related Art

Complex parts, such as those used in aerospace applications, are often manufactured from composite materials. Where the composite parts comprise materials such as thermoplastics, they may be referred to as skins or laminates and may include several layers which are first laid up and consolidated prior to being joined and fixed with any other composite part. Following consolidation of a first composite part, a second composite part may be laid up for joining with the first composite part and the combination may be induction welded/fused together (such as at a step joint or lap joint).

In some prior art methods, step-welding methods may be used for assembly of two thermoplastic composite parts, but pressure application may be needed to prevent deformation of the composite part during this welding. Traditionally, a rigid pressure pad is placed between an inductor and the part being induction heated/welded to allow for uniform pressure application and to prevent deformation of the composite part during welding. However, applying such pressure via rigid pressure pads can create other issues, particularly at edges of heat zones in the weld step where deconsolidation has been observed in transition zones between molten and rigid polymer. This can occur due to an inherent lack of compliance at the transition zone between molten and rigid polymer and can cause localized deconsolidation at the edges of the weld, along the weld length. In addition, composite materials can have non-uniform thickness due to variable fiber volume fraction and area weight which can lead to non-uniform pressure application when using a rigid pressure pad that can lead to defects. Resulting spots of deconsolidation generally cannot be adequately removed with re-welding or successive steps. Thus, a need exists for a system and method for applying sufficient pressure during induction-welding of thermoplastic composite parts together that does not suffer from the above-described disadvantages.

SUMMARY OF THE INVENTION

It has been discovered that lack of conformability of the pressure pad used in prior art step-welding methods prevents adequate consolidation pressure at edges of the heat zones during such welding. Alternative conformable materials such as silicone can therefore be used. However, the life of such a pressure pad would be low due to the high exposure temperatures and a potential for contamination of the weld due to degradation of the conformable pad. Therefore, embodiments of the present invention solve the above-mentioned problems and provide a distinct advance in the art of joining composite parts together via heating and/or welding methods. More particularly, embodiments of the invention tion provide a system and method for joining thermoplastic composite parts using a semi-conformable pressure pad, as described herein.

Various embodiments of the invention may provide a system and a method for fusing at least two thermoplastic composite components together via induction welding. In one embodiment, the system may include a composite part comprising a multi-layer composite pressure pad, and an inductor. The composite part may include a first thermoplastic composite component having a first faying surface and a first non-faying surface and a second thermoplastic composite component having a second faying surface. At least a portion of the second faying surface may be in contact with at least a portion of the first faying surface for fusing thereto. The first and second thermoplastic composite components may each comprise conductive fibers and at least one matrix material (e.g., a first matrix material). The multi-layer composite pressure pad may be placed over at least a portion of the first thermoplastic composite component and/or the second thermoplastic composite component. The multi-layer composite pressure pad may have a first layer and a second layer. The first layer may include non-conductive reinforcement and a second matrix material with a melting point that is the same or lower than a melting point of the at least one matrix material of the first and the second thermoplastic composite components. The second layer may be rigid and non-conductive and may remain rigid at temperatures up to a threshold that is greater than the melting point of the first and the second thermoplastic composite components. The first layer may be positioned/located between the second layer and the first thermoplastic composite component and/or the second thermoplastic composite component. The inductor may be in contact with the second layer of the multi-layer composite pressure pad and may be activated for heating the first faying surface and the second faying surface for fusing thereof via induction welding.

In other embodiments, a method of using this system may include placing the faying surfaces of the thermoplastic composite components in contact with each other, placing a separation layer over and against one of the thermoplastic composite components, and placing the multi-layer composite pressure pad over and in contact with the separation layer. The method may also include placing the activated inductor against the multi-layer composite pressure pad for induction welding the two thermoplastic composite components to each other. The thermoplastic composite components may have conductive fibers while the multi-layer composite pressure pad may have a first layer and a second layer with non-conductive reinforcement such as fibers. The first layer may at least partially melt during induction welding of the two thermoplastic composite components while the second layer may remain rigid throughout this welding.

The separation layer may prevent the first layer of the multi-layer composite pressure pad from melding together with the first or second thermoplastic composite components. The low melting point of the first layer of the multi-layer composite pressure pad makes it at least partially fluid/molten during these welding steps described herein, allowing this portion of the multi-layer composite pressure pad to conform to minor deviances and/or variations while applying plastic pressure to prevent deconsolidation of either of the first or second thermoplastic composite components. The fiber reinforcement of the first layer lends stiffness to the multi-layer composite pressure pad, preventing extreme movement of resin/matrix material. The multi-layer composite pressure pad may also be re-used, as the thermoplastic material can be re-heated and re-formed.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
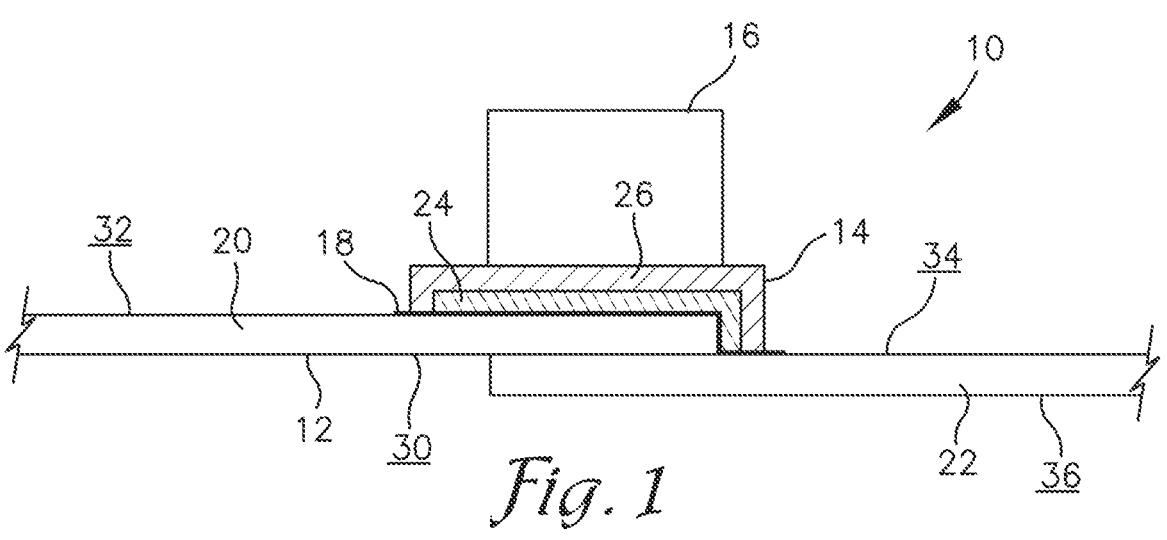
FIG. 1 is a cross-sectional elevation view of a system for induction welding thermoplastic composite components together, constructed in accordance with various embodiments of the present invention.
Figures 4, 5:
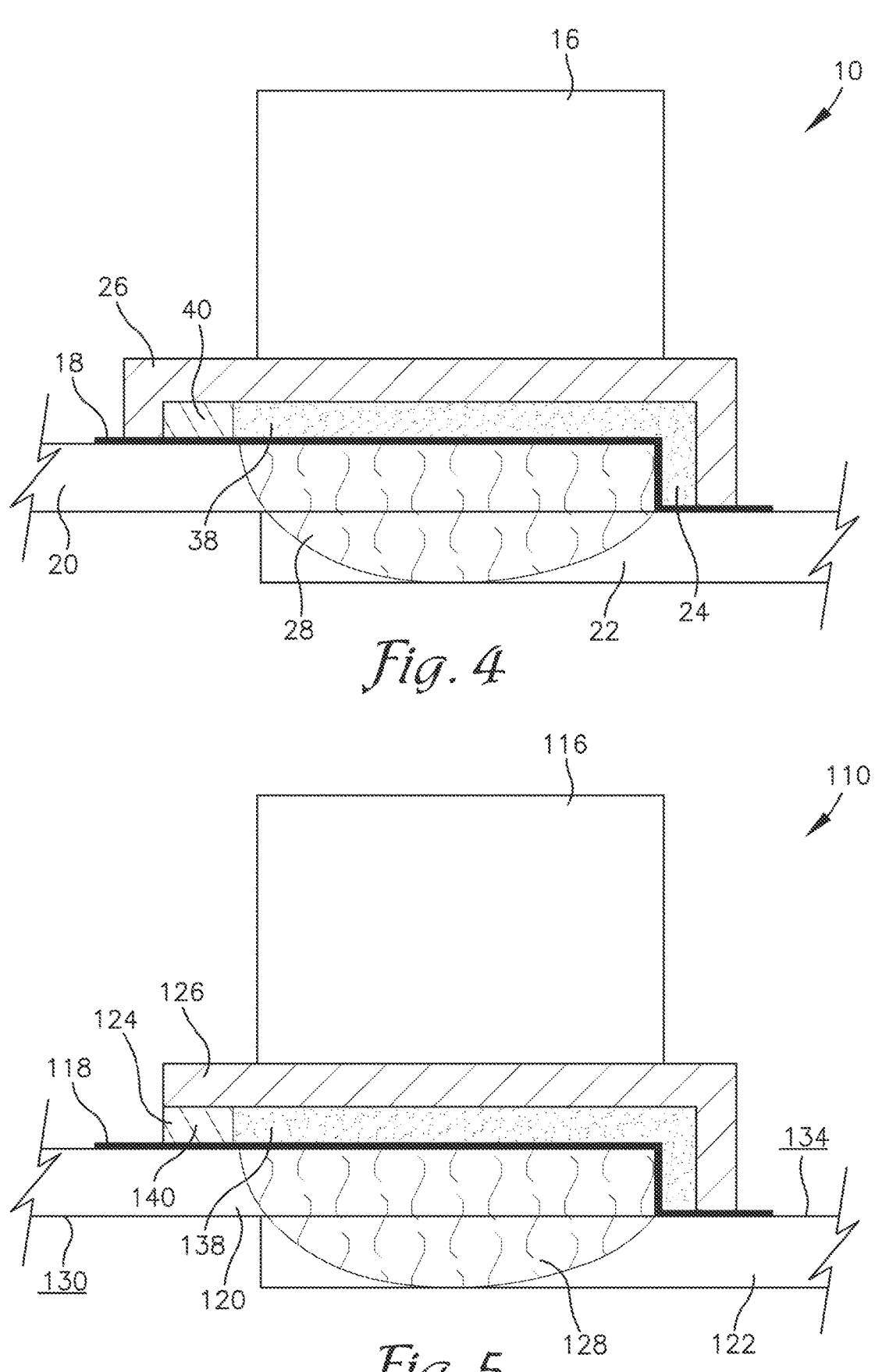
FIG. 4 is a cross-sectional elevation view of the system of FIG. 3, depicting further melting of the first layer of the multi-layer composite pressure pad via conduction, in accordance with various embodiments of the present invention.
Figure 7:
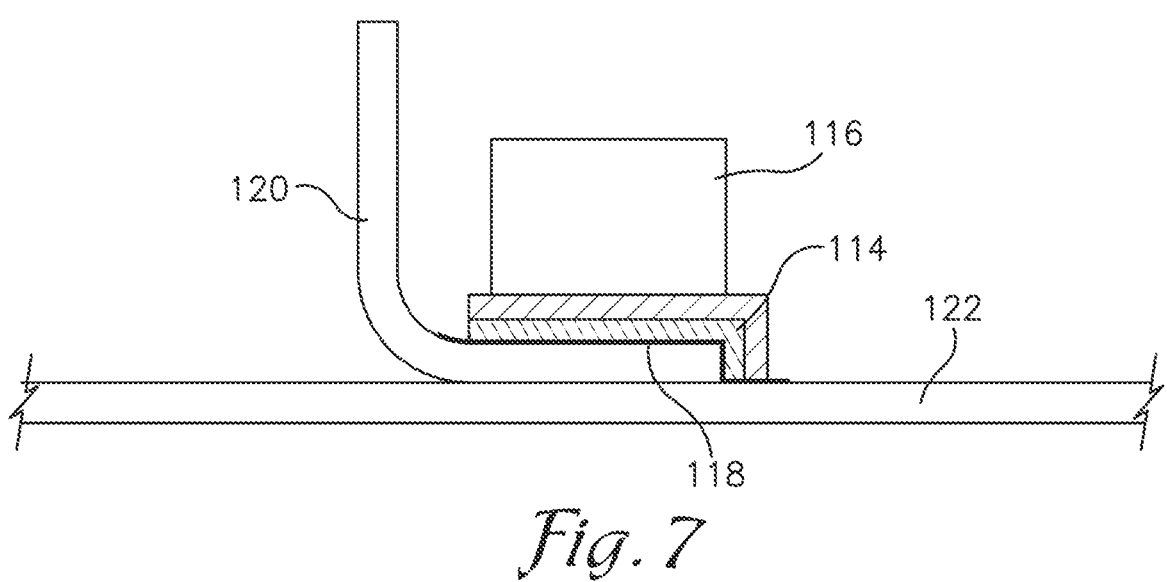
Figure 8:
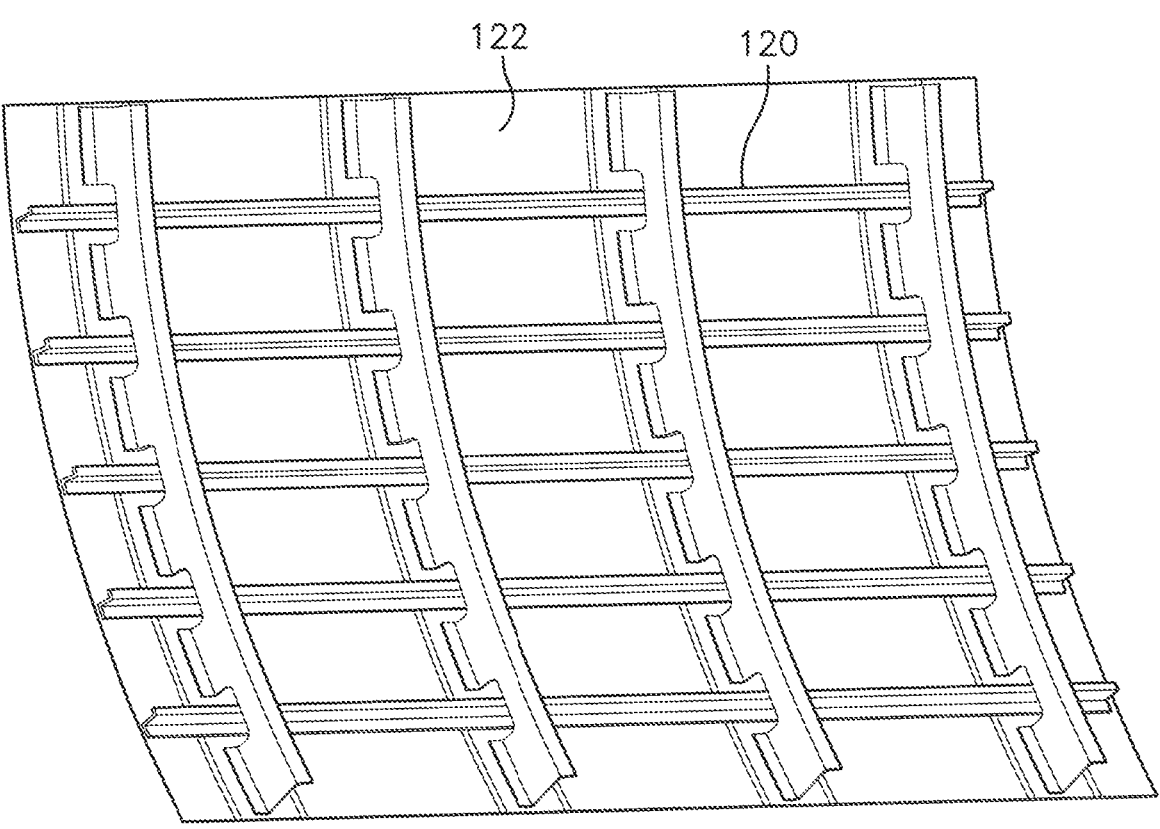

FIG. 5 is a cross-sectional elevation view of an alternative embodiment of the system of FIG. 4 with a portion of a second layer of the multi-layer composite pressure pad omitted and a first layer of the multi-layer composite pressure pad having an outer margin portion that is unmelted and assists in retaining a melted portion thereof, in accordance with various embodiments of the present invention;

FIG. 6 is a flow chart illustrating at least a portion of the steps of an exemplary method for welding thermoplastic composite components together according to various embodiments of the present invention;

FIG. 7 is a cross-sectional elevation view of a system similar to the system of FIG. 1 for induction welding thermoplastic composite components together, wherein the thermoplastic composite components include a reinforcement structure and a composite skin; and FIG. 8 is perspective view of a completed composite component induction welded via the system of FIG. 7, in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the present invention is defined only by the appended claims, along with the full scope of equivalents to which such claims are entitled.

A system 10 constructed in accordance with various aspects of the current invention for fusing at least two thermoplastic composite components together is shown in FIGS. 1-4. The system 10 may broadly comprise a composite part 12, a multi-layer composite pressure pad 14, and an inductor 16. In some embodiments, a separation layer 18 may also be included between the multi-layer composite pressure pad 14 and the composite part 12. The composite part 12 may comprise at least two thermoplastic composite components to be induction welded together. Specifically, the composite part 12 may include a first thermoplastic composite component 20 and a second thermoplastic composite component 22.

The first thermoplastic composite component 20 may have a first faying surface 30 and a first non-faying surface 32 opposite the first faying surface. The second thermoplastic composite component 22 may comprise a second faying surface 34 and a second non-faying surface 36 opposite the second faying surface 34. At least a portion of the second faying surface 34 can be placed in contact with at least a portion of the first faying surface 30 for fusing together of the first and second thermoplastic composite parts 20,22. The first and second thermoplastic composite components 20,22 may each comprise one or more composite plies. The composite plies may include conductive fibers such as carbon or other metallic fibers and may each comprise a first matrix material. However, in some embodiments, at least some of the composite plies of the first thermoplastic composite component 20 may include different matrix materials relative to the matrix material used for at least some of the composite plies of the second thermoplastic composite component 22 without departing from the scope of the technology described herein. Fiber orientations of the composite plies stacked together to form the first and/or second thermoplastic composite components 20,22 may be unidirectional or may have various other fiber orientations relative to each successive composite ply stacked together to form the first and/or second thermoplastic composite parts 20,22.

The first thermoplastic composite component 20 may have edge surfaces extending between the first faying surface 30 and the first non-faying surface 32. Likewise, the second thermoplastic composite component 22 may have edge surfaces extending between the second faying surface 34 and the second non-faying surface 36. The first thermoplastic composite component 20 and the second thermoplastic composite component 22 may be in a step-like configuration. However, other mating configurations between the first and second thermoplastic composite components 20,22 may be used without departing from the scope of the technology described herein.

The multi-layer composite pressure pad 14 may be placed over at least a portion of the separation layer 18 and/or at least one of the first thermoplastic composite component 20 and the second thermoplastic composite component 22. In some embodiments, the separation layer 18 may extend over/against at least a portion of the first non-faying surface 32 and at least one of the edge surfaces of the first thermoplastic composite component 20. Likewise, in some embodiments, the multi-layer composite pressure pad 14 may extend over/against at least a portion of the first non-faying surface 32 (and/or over the separation layer 18 thereon) and at least one of the edge surfaces of the first thermoplastic composite component 20, thus having an "L" configuration. Furthermore, the portion of the multi-layer composite pressure pad 14 extending over/against the at least one of the edge surfaces of the first thermoplastic composite component 20 may terminate against the second faying surface 34 of the second thermoplastic composite component 22 and/or just outward thereof or against the separation layer 18, as depicted in FIGS. 1-4.

The multi-layer composite pressure pad 14 may comprise a first layer 24 and a second layer 26. The first layer 24 may be a composite laminate or consolidated stack of composite plies including non-conductive reinforcement (e.g., microspheres) and/or non-conductive fibers and a second matrix material with a melting point that is the same or lower than a melting point of the first matrix material or any of the matrix materials used in the first and the second thermoplastic composite components 20,22. The first layer 24 may be placed and/or located between the second layer 26 and at least one of the separation layer 18, the first thermoplastic composite component 20, and the second thermoplastic composite component 22. In some embodiments, the second matrix material of the first layer may be composed of polyphenylene sulfide (PPS), low melt polyetheretherketone (LM PEEK), Polyethylenimine (PEI), or the like. However, other matrix material known in the art may be used for the first layer 24 without departing from the scope of the technology described herein. In some embodiments, the first layer 24 may have substantially the same or identical matrix material as the first and/or second thermoplastic composite components 20,22. However, having the second matrix material be a material with a slightly lower melting point than the first matrix may give greater flexibility and conformability to the first layer 24 to contour to the first and/or second thermoplastic composite components 20,22 being pressed against by the multi-layer composite pressure pad 14.

In some embodiments, the second layer 26 is rigid and non-conductive. Furthermore, the second layer 26 may remain rigid at temperatures up to a threshold that is greater than the melting point of the first and the second thermoplastic composite components 20,22 and/or the melting point of the matrix material thereof. In some embodiments, the second layer 26 may be a ceramic layer and/or comprise ceramic. In other embodiments, the second layer 26 may be a stack of consolidated composite plies or a laminate and may comprise non-conductive fibers and a third matrix material with a melting point that is greater than the melting point of the first and the second thermoplastic composite components 20,22 and/or first matrix material or any of the matrix materials used in the first and/or the second thermoplastic composite components 20,22. Furthermore, in some embodiments the third matrix material may also have a melting point that is greater than the melting point of the second matrix material. For example, the third matrix material may be composed of polyetherketoneketone (PEKK), PEEK, or the like.

Figure 2:
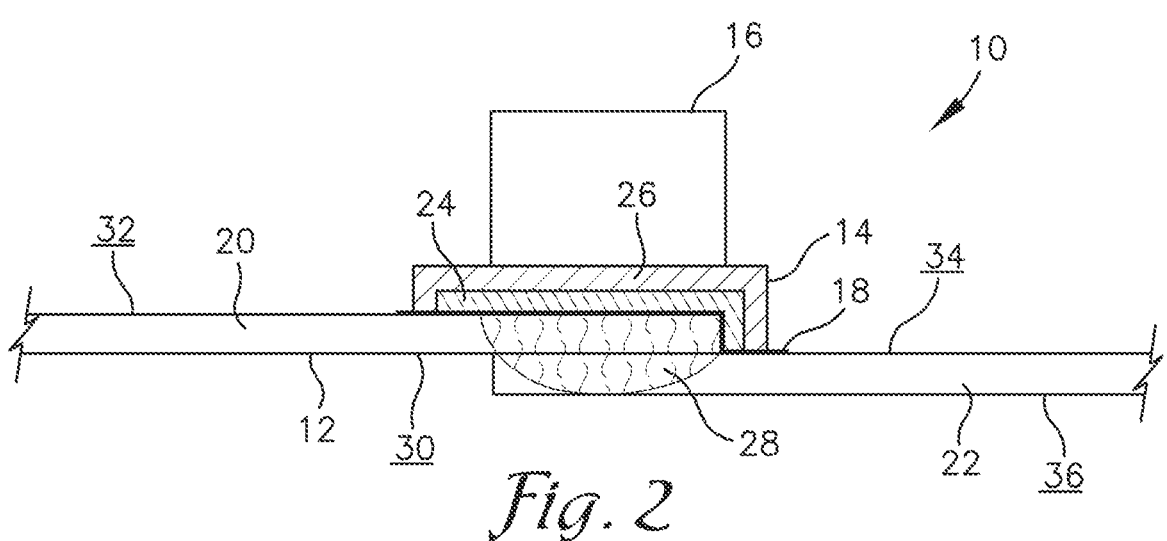
FIG. 2 is a cross-sectional elevation view of the system of FIG. 1, depicting a heated zone of the thermoplastic composite components being heated via induction, in accordance with various embodiments of the present invention.
Figure 3:
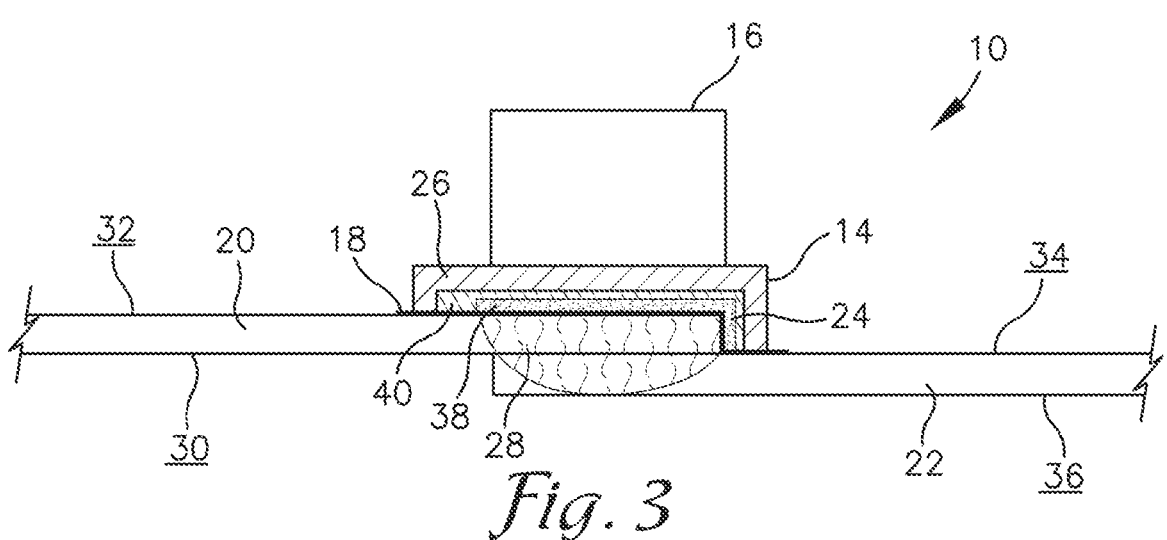
FIG. 3 is a cross-sectional elevation view of the system of FIG. 1, depicting melting of a portion of a first layer of a multi-layer composite pressure pad via conduction from the heated zone, in accordance with various embodiments of the present invention.

The second layer 26 may encase most or all sides of the first layer 24, as depicted in FIGS. 1-3, except for sides of the first layer 24 that face at least one of the first thermoplastic composite component 20 and the second thermoplastic composite component 22. Specifically, in some embodiments, sides of the first layer 24 that are not encased by the second layer 26 may be pressed against the separation layer 18. For example, as depicted in FIG. 1, the first layer 24 may be pressed against the separation layer 18 and/or the first thermoplastic composite component 20 (e.g., the first non-faying surface 32 or the separation layer 18 thereon and at least one of the edge surfaces of the first thermoplastic composite component 20) and may have first layer edges that terminate at a surface of the second thermoplastic composite component 22 (e.g., at the second faying surface 34) and/or that terminate against the second layer 26.

The inductor 16, as illustrated in FIGS. 1-4, may be an activated inductor configured for induction welding the first and second thermoplastic composite components 20,22 together at their respective faying surfaces 30,34 via induction welding. The inductor 16 may be in contact with the second layer 26 of the multi-layer composite pressure pad 14 and pressure may be applied by the inductor 16 to press the multi-layer composite pressure pad 14 toward and/or against the first and second thermoplastic composite components 20,22. Induction welding uses electromagnetic induction to heat workpieces to be fused or welded together. The fibers of the first and second thermoplastic composite components 20,22 are electrically conductive, and the main heating effect is resistive heating due to induced eddy currents (e.g., graphically represented in FIGS. 2-4 as inductive heat 28) via activation of the inductor. Although directly in contact with the inductor 16, the multi-layer composite pressure pad 14 is not inductively heated thereby, because it is made of non-conductive materials. When activated, the inductor 16 heats at least a portion of the first thermoplastic composite component 20 and at least a portion of the second thermoplastic composite component 22 to a temperature at or beyond the melting point of the first and the second thermoplastic composite components, thus providing the induction welding/fusing at a location on the composite part 12 in line with the inductor 16.

In some embodiments, the separation layer 18 is a release film (e.g., Kapton film, polyimide film, or the like) placed over and against the first non-faying surface 32 of the first layer 24 and located between the first layer 24 of the multi-layer composite pressure pad 14 and at least one of the first thermoplastic composite component 20 and the second thermoplastic composite component 22. Specifically, the separation layer 18 may be a release film and has a higher melting point than the first layer 24 and a higher melting point than at least one of the first thermoplastic composite component 20 and the second thermoplastic composite component 24. The melting point for the second layer 26 can be less than, equal to, or greater than the melting point for the separation layer 18, as long as both components do not melt during the induction welding of the first and second thermoplastic composite components 20, 22.

The system 10 may include additional components such as a pressure source configured to provide compression pressures during the curing and/or fusing process(es), a source of resin (e.g., where thermosetting composites are used), and/or other equipment configured to provide matrix material and/or lay-up skin via automated fiber placement (AFP) during a lay-up process or placement process, without departing from the spirit of the present invention.

In an alternative embodiment depicted in FIG. 5, an alternative system 110 is substantially identical to system 10 described above, except that at least one first layer edge of a first layer 124 may be exposed and/or may not terminate against a second layer 126, but rather may extend far enough outward (e.g., be oversized and/or extend far enough horizontally) away from surfaces being heated (e.g., away from first and second faying surfaces 130,134) such that no melting of the first layer 124 occurs at that exposed edge, as later described herein and depicted in FIG. 5. Other than these alterations, the first and second layers 124,126 and the first and second faying surfaces 130,134 may be identical or substantially identical to the first and second layers 24,26 and the first and second faying surfaces 30,34, respectively. Other features of the alternative system 110 may also be identical to system 10, such as first and second thermoplastic composite components 120,122, a separation layer 118, and an inductor 116 being substantially identical to the first and second thermoplastic composite components 20,22, the separation layer 18, and the inductor 16, respectively. Furthermore, in FIG. 5, an inductive heat 128 graphically depicted is identical to the inductive heat 28 depicted in FIGS. 2-4.

In use, the system 10 and/or the alternative system 110 described above may operate as follows. Specifically, the inductor 16 may be activated, and in response to this activation, the first layer 26 may have a melted portion 38 (or 138 in FIG. 5) in which the second matrix material of the first layer 26 is melted via conduction from the first thermoplastic composite component 20 being melted via induction welding, as depicted in FIGS. 3-5. In some embodiments, the entirety of the first layer 24 may be the melted portion 38. However, in other embodiments, the first layer 24 may additionally include an outer margin portion 40 (or 140 in FIG. 5) where the second matrix material of the first layer 24 remains solid while the second matrix material in the melted portion 38 of the first layer 24 remains melted, thus trapping the melted portion 38 of the first layer 24 between the second layer 26, the outer margin portion 40 of the first layer 24, and at least one of the separation layer 18, first thermoplastic composite component 20, and the second thermoplastic composite component 22. In this manner, the fluid melted portion 38 does not escape during induction welding (particularly in the embodiment depicted in FIG. 5), but its fluid nature allows for the multi-layer composite pressure pad 14 to conform to minor deviances/variations in the composite part 12 while applying plastic pressure to prevent deconsolidation of either the first or second thermoplastic composite components 20,22.

In some embodiments, the melted portion is merely heated sufficiently to have a softened matrix material that still is malleable enough to also allow for such minor deviances/variations. This induction welding technique using the multi-layer composite pressure pad 14 described above can be used for step-welding at least two thermoplastic composite components together or for other induction welding techniques involving two composite parts comprising conductive fibers.

In use, the separation layer 18 may prevent the first layer 24 of the multi-layer composite pressure pad 14 from melding together with the first or second thermoplastic composite components 20,22. The low melting point of the first layer 24 of the multi-layer composite pressure pad 14 makes it at least partially fluid/molten during the welding steps described herein, allowing this molten portion of the multi-layer composite pressure pad 14 to conform to minor deviances and/or variations while applying plastic pressure to prevent deconsolidation of either of the first or second thermoplastic composite components 20,22. The reinforcement of the first layer 24 lends stiffness to the multi-layer composite pressure pad 14, preventing extreme movement of resin/matrix material therein. Furthermore, the second layer 26 also assists in preventing extreme movement of the resin/matrix material or the second matrix material of the first layer 24. The multi-layer composite pressure pad 14 may also be re-used, as the thermoplastic material can be re-heated and re-formed.

At least a portion of the steps of a method 600 for fusing and/or induction welding at least two thermoplastic composite components together using the system 10 in accordance with various embodiments of the present invention is listed in FIG. 6. The steps may be performed in the order as shown in FIG. 6, or they may be performed in a different order. Further, some steps may be performed concurrently as opposed to sequentially. In addition, some steps may be omitted. Still further, embodiments of the present invention may be performed using systems other than system 10 without departing from the spirit of the present invention.

The method 600 may comprise a step of placing the first thermoplastic composite component 20 onto the second thermoplastic composite component 22, as depicted in block 602. Specifically, the first thermoplastic composite component 20 may be placed onto or against the second thermoplastic composite component 22 such that at least a portion of the first faying surface 30 and at least a portion of the second faying surface 34 contact each other. As described above, the first and second thermoplastic composite components 20,22 each comprise conductive fibers. In some embodiments, this step may include offsetting the first thermoplastic composite component 20 relative to the second thermoplastic composite component 22 in a step-joint or lap-joint configuration. That is, in some example embodiments, only a portion of the first faying surface 30 contacts only a portion of the second faying surface 34. Alternatively, in some embodiments, only a portion of the first faying surface 30 contacts all of the second faying surface 34 and/or all of the first faying surface 30 contacts only a portion of the second faying surface 34.

A further embodiment is depicted in FIGS. 7-8, wherein the first thermoplastic composite component 20 may be a stiffener, frame, and/or another reinforcement structure and the second thermoplastic composite component 22 may be a composite skin or laminate, such as those used in manufacturing of aerospace components. For example, FIGS. 7 and 8 depict a first thermoplastic composite component 120 that is a stiffener and a second thermoplastic composite component 122 that is a laminate composite skin. Beyond the shape and configuration, the first and second thermoplastic composite components 120,122 may be identical or substantially identical to the first and second thermoplastic composite components 20,22 described above and may include conductive fibers and/or conductive reinforcement that allows for inductive welding as described herein. Likewise, the embodiment depicted in FIGS. 7-8 may include a multi-layer composite pressure pad 114, an inductor 116, and a separation layer 118 that are identical or substantially identical to the multi-layer composite pressure pad 14, the inductor 16, and the separation layer 18 respectively, as described in detail above. FIG. 8 further depicts a completed component comprising multiple reinforcement structures (e.g., the first thermoplastic composite component 120) attached to the second thermoplastic composite component 122.

The method 600 may further comprise a step of placing the separation layer 18 over and against at least a portion of one or both of the first thermoplastic composite component 20 and the second thermoplastic composite component 22, as depicted in block 604. Furthermore, the method 600 may comprise a step of placing the multi-layer composite pressure pad 14 over and in contact with the separation layer 18, as depicted in block 606, and a step of placing the inductor 16 against the second layer 26 of the multi-layer composite pressure pad 14, as depicted in block 608. The inductor 16 may be activated during this step or in a separate subsequent step. For example, the method 600 may include a step of activating the inductor 16 until the first and second thermoplastic composite components 20,22 at least partially melt and fuse together, as depicted in block 610. The steps of blocks 608 and/or 610 may result in heating the first thermoplastic composite component 20 and the second thermoplastic composite component 22 via the activated inductor 16 to a temperature at or beyond the melting point of the first and the second thermoplastic composite components 20,22.

Additionally, placing the inductor 16 against the second layer 26 of the multi-layer composite pressure pad 14 may include pressing the inductor 16 toward and against the multi-layer composite pressure pad 14 with enough force to push on or compress the first thermoplastic composite component 20 and/or the second thermoplastic composite component 22 via the multi-layer composite pressure pad 14. That is, the pressure induced via the inductor 16 presses the multi-layer composite pressure pad toward and against the separation layer, pressing the first thermoplastic composite component against the second thermoplastic composite component at the first and second faying surfaces 30,34. The activated inductor 16, in this placement and configuration as depicted in FIG. 2 and described above, induction welds the first faying surface 30 to the second faying surface 34, thus forming the composite part 12. In some embodiments, step 508 includes pressing the activated inductor 16 against the second layer 26 such that peripheral portions of the second layer 26 press against at least one of the separation layer 18, the first thermoplastic composite component 20, and the second thermoplastic composite component 22.

The activated inductor 16 should be configured or adjusted in accordance with specific materials profiles or characteristics of the first and second thermoplastic composite components 20,22 such that the first and second faying surfaces 30,34 are heated above the melting point of the first matrix material (or any of the matrix materials of the first and second thermoplastic composite components 20,22) for a sufficient amount of time to cause induction welding therebetween. The types and configuration of conductive fibers, the thickness, the composition of the first matrix material, and other such characteristics can affect how the inductor 16 is fine-tuned or configured for a given induction welding process in accordance with the steps described herein. Furthermore, at least a portion of the second matrix material of the first layer 24 may become melted or molten via conduction experienced through the separation layer 18 via the first and/or second thermoplastic composite components 20,22 while they are being induction welded.

As noted above, conduction from the first thermoplastic composite component 20 may melt at least a portion of the second matrix material of the first layer 24 in contact with the separation layer 18. This same conduction may be low enough that the second layer 26 remains solid, without melting the third matrix material during this induction welding method. The second layer 26 may encase all sides of the first layer 24 except for sides of the first layer that contact the separation layer 18. This may prevent the melted second matrix material from escaping outward from the multi-layer composite pressure pad 14 during induction welding of the composite part 12. In this configuration, the second layer 26 may encase all sides of the first layer 24 except for sides of the first layer 24 that contact the separation layer 18, the first thermoplastic composite component 20, or the second thermoplastic composite component 22.

Thus, the melted portion of the first layer 24 may remain contained between the second layer 26 of the multi-layer composite pressure pad 14 and at least one of the separation layer 18, the first thermoplastic composite component 20, and the second thermoplastic composite component 22.

In some embodiments, as described above, at least a portion of the second matrix material of the first layer 26 melted by conduction is referred to as the melted portion 38 and the first layer 24 may also comprise the outer margin portion 40 where the second matrix material of the first layer 24 remains solid (e.g., not melted) while the second matrix material in the melted portion of the first layer 24 remains melted. For example, as depicted in FIG. 5 this configuration may thereby trap the melted portion 140 of the first layer 124 between the second layer 126, the outer margin portion 140 of the first layer 124, and the separation layer 118. Thus, the fluid melted portion 138 does not escape during induction welding using the multi-layer composite pressure pad, but its fluid nature allows for the multi-layer composite pressure pad to conform to minor deviances/variations in the composite part while applying plastic pressure to prevent deconsolidation of either the first or second thermoplastic composite components 120,122. However, in other embodiments, as depicted in FIG. 4, the first layer 24 may be completely surrounded by the second layer 26 and the separation layer 18 and/or the composite part 12, further ensuring that fluid of the melted portion 38 does not leak out during this induction welding process.

Once the induction welding is completed, the inductor 16 may be removed, and the multiplayer composite pressure pad 14 may be removed from the finished composite part 12 (comprising the first thermoplastic composite component 20 and the second thermoplastic composite component 22 now welded together). The separation layer 18 may allow for ease of removal once this process is complete. Note that the system and methods described herein may be used for step welding of new components or may alternatively be used for repair and/or patching of a composite component. Furthermore, in some alternative embodiments, instead of the first and second thermoplastic composite components 20,22, other thermoplastic components may be joined using the techniques herein without any conductive fiber, although one or more conductive (or magnetically susceptible) susceptors (not shown) may be needed in such alternative embodiments to generate heat with induction at the bondline/faying surfaces described herein.

Although the invention has been described with reference to the embodiments illustrated in the attached drawing figures, it is noted that equivalents may be employed and substitutions made herein without departing from the scope of the invention as recited in the claims.

For instance, it should be noted that composite parts are typically formed from composite material, as is known in the art, which generally includes at least two constituent components—a reinforcement material (e.g., microspheres or fiber) and a matrix material. The reinforcement material generally provides mechanical strengthening properties, such as high tensile strength, to the composite material, while the matrix material acts as a binder to hold the reinforcement material together. The reinforcement material and the matrix material may possess additional properties not discussed herein. Furthermore, the composite material may include additional components not discussed herein.

Examples of reinforcement materials that may be used with the current invention include, but are not limited to, fiber materials such as carbon fiber, boron fiber, fiberglass, aramid fiber, ceramic fiber, and the like without departing from the spirit of the present invention. As discussed above, the multi-layer composite pressure pad 14 may utilize non-conductive reinforcement materials like ceramic or glass fibers or microspheres while the first and second thermoplastic composite components 20,22 may utilize conductive reinforcement materials like carbon fiber to allow for heating thereof via induction welding. In the case of fiber-based reinforcement materials, the fiber may exist in one of at least two forms—either preimpregnated (prepreg), in which the fiber may be coated with a matrix material that is uncured and/or requires further heat treatment, such as uncured resin or thermoplastic polymer, or as dry fiber, with no matrix material incorporated prior to part manufacture. The matrix material may typically be in the form of thermoplastic polymers such as polycarbonates, polyamides, polyphenylene sulfide, polyetherimide, polyetheretherketone, polyetherketoneketone, and the like. The matrix material may also or alternatively be in the form of thermosetting polymer resins, such as epoxies, bismaleimides, vinyl esters, phenolics, polyimides and the like, among others. The matrix material may be selected according to relative melting points as described above, such that the second layer 26 remains rigid while the matrix material of the first layer 24 and/or induction-heated portions of the first and second thermoplastic composite components 20,22 melt or become molten. It should be noted that thermoplastic film adhesives may be incorporated between parts comprising thermosetting matrix materials, and that fixing one such part to another includes curing the thermoplastic film adhesives. It should also be noted that mixtures of composite materials may be used to form a single composite part without departing from the spirit of the present invention.

Having thus described various embodiments of the invention, what is claimed as new and desired to be protected by Letters Patent includes the following:

1. A system for fusing at least two thermoplastic composite components together, the system comprising:
    a composite part comprising—
        a first thermoplastic composite component comprising a first faying surface and a first non-faying surface;
        a second thermoplastic composite component comprising a second faying surface, wherein at least a portion of the second faying surface is in contact with at least a portion of the first faying surface for fusing thereto, wherein the first and second thermoplastic composite components each comprise one or more matrix materials and conductive fibers;
    a multi-layer composite pressure pad placed over at least a portion of at least one of the first thermoplastic composite component and the second thermoplastic composite component, the multi-layer composite pressure pad comprising:
        a first layer having non-conductive reinforcement and a second matrix material with a melting point that is the same or lower than a melting point of the one or more matrix materials of the first and the second thermoplastic composite components, and
        a second layer that is rigid and non-conductive and remains rigid at temperatures up to a threshold that is greater than the melting point of the one or more matrix materials of the first and the second thermoplastic composite components, wherein the first layer is between the second layer and at least one of the first thermoplastic composite component and the second thermoplastic composite component; and
    an inductor in contact with the second layer of the multi-layer composite pressure pad, wherein the inductor is activated for heating the first faying surface and the second faying surface for fusing thereof via induction welding.

2. The system of claim 1, further comprising a separation layer placed over and against the first non-faying surface and located between the first layer of the multi-layer composite pressure pad and at least one of the first thermoplastic composite component and the second thermoplastic composite component.

3. The system of claim 2, wherein the separation layer is a release film and has a higher melting point than the second matrix material of the first layer of the multi-layer composite pressure pad and a higher melting point than the one or more matrix materials of at least one of the first thermoplastic composite component and the second thermoplastic composite component.

4. The system of claim 1, wherein the second layer of the multi-layer composite pressure pad comprises non-conductive reinforcement and a third matrix material having a melting point that is greater than the melting point of the one or more matrix materials of the first and the second thermoplastic composite components.

5. The system of claim 1, wherein the second layer encases all sides of the first layer except for sides of the first layer that face at least one of the first thermoplastic composite component and the second thermoplastic composite component.

6. The system of claim 1, wherein the inductor presses the multi-layer composite pressure pad against at least one of the first thermoplastic composite component and the second thermoplastic composite component.

7. The system of claim 1, wherein, when activated, the inductor and heats the first thermoplastic composite component and the second thermoplastic composite component to a temperature at or beyond the melting point of the one or more matrix materials of the first and the second thermoplastic composite components.

8. The system of claim 7, wherein the first layer comprises a melted portion in which the second matrix material of the first layer is melted via conduction from the first thermoplastic composite component.

9. The system of claim 8, wherein the first layer comprises an outer margin portion where the second matrix material of the first layer remains solid while the second matrix material in the melted portion of the first layer remains melted, thus trapping the melted portion of the first layer between the second layer, the outer margin portion of the first layer, and at least one of the first thermoplastic composite component and the second thermoplastic composite component.

10. A method for fusing at least two thermoplastic composite components together, the method comprising:
    placing a first thermoplastic composite component comprising a first faying surface and a first non-faying surface onto a second thermoplastic composite component comprising a second faying surface such that the first faying surface and the second faying surface contact each other, wherein the first and second thermoplastic composite components each comprise conductive fibers and a first matrix material;
    placing a separation layer over and against at least a portion of one or both of the first thermoplastic composite component and the second thermoplastic composite component;
    placing a multi-layer composite pressure pad over and in contact with the separation layer, the multi-layer composite pressure pad comprising:

a first layer having non-conductive reinforcement and a second matrix material with a melting point that is the same or lower than a melting point of the first matrix material of the first and the second thermoplastic composite components, wherein at least a portion of the first layer contacts the separation layer, and a second layer having non-conductive fibers and a third matrix material with a melting point that is greater than the melting point of the first matrix material of the first and the second thermoplastic composite components, wherein the first layer is between the second layer and the separation layer; and placing an activated inductor against the second layer of the multi-layer composite pressure pad, wherein the activated inductor induction welds the first faying surface to the second faying surface.

11. The method of claim 10, wherein the separation layer is a release film and has a higher melting point than the second matrix material of the first layer of the multi-layer composite pressure pad and a higher melting point than the first matrix material of the first thermoplastic composite component and the second thermoplastic composite component.

12. The method of claim 10, wherein the second layer encases all sides of the first layer except for sides of the first layer that contact the separation layer.

13. The method of claim 10, wherein placing an activated inductor against the second layer comprises pressing the activated inductor against the multi-layer composite pressure pad toward and against the separation layer, pressing the first thermoplastic composite component against the second thermoplastic composite component at the first and second faying surfaces.

14. The method of claim 10, further comprising heating the first thermoplastic composite component and the second thermoplastic composite component via the activated inductor to a temperature at or beyond the melting point of the first matrix material of the first and the second thermoplastic composite components.

15. The method of claim 14, wherein conduction from the first thermoplastic composite component melts at least a portion of the second matrix material of the first layer in contact with the separation layer.

16. The method of claim 15, wherein the at least a portion of the second matrix material of the first layer melted by conduction is a melted portion and wherein the first layer comprises an outer margin portion where the second matrix material of the first layer remains solid while the second matrix material in the melted portion of the first layer remains melted, thereby trapping the melted portion of the first layer between the second layer, the outer margin portion of the first layer, and the separation layer.

17. A method for step-welding at least two thermoplastic composite components together, the method comprising:

placing a first thermoplastic composite component comprising a first faying surface and a first non-faying surface onto a second thermoplastic composite component comprising a second faying surface such that the first faying surface and the second faying surface contact each other, wherein the first and second thermoplastic composite components each comprise conductive fibers and a first matrix material;

placing a separation layer over and against at least a portion of one or both of the first thermoplastic composite component and the second thermoplastic composite component, wherein the separation layer is a release film;

placing a multi-layer composite pressure pad over and in contact with the separation layer, the multi-layer composite pressure pad comprising:

a first layer having non-conductive fibers and a second matrix material with a melting point that is the same or lower than a melting point of the first matrix material, wherein at least a portion of the first layer contacts the separation layer, and a second layer having non-conductive fibers and a third matrix material with a melting point that is greater than the melting point of the first matrix material, wherein the first layer is between the second layer and the separation layer; and placing an activated inductor against the second layer of the multi-layer composite pressure pad, wherein the activated inductor induction welds the first faying surface to the second faying surface via induction welding, wherein the separation layer has a higher melting point that the first matrix material and the second matrix material.

18. The method of claim 17, wherein conduction from the first thermoplastic composite component melts at least a portion of the second matrix material of the first layer in contact with the separation layer, wherein the at least a portion of the second matrix material of the first layer melted by conduction is a melted portion.

19. The method of claim 18, further comprising:

pressing the activated inductor against the second layer such that peripheral portions of the second layer press against at least one of the separation layer, the first thermoplastic composite component, and the second thermoplastic composite component, wherein the second layer encases all sides of the first layer except for sides of the first layer that contact the separation layer, the first thermoplastic composite component, or the second thermoplastic composite component, wherein the melted portion of the first layer remains contained between the second layer of the multi-layer composite pressure pad and at least one of the separation layer, the first thermoplastic composite component, and the second thermoplastic composite component.

20. The method of claim 17, wherein the first thermoplastic composite component is a stiffener and the second thermoplastic composite component is a composite skin.

* * * * *